United States Patent [19]
Klinner

[11] Patent Number: 4,545,188
[45] Date of Patent: Oct. 8, 1985

[54] CROP ENGAGING DEVICE AND METHOD

[75] Inventor: Wilfred E. Klinner, Milton Keynes, England

[73] Assignee: National Research Development Corporation, London, England

[21] Appl. No.: 477,872

[22] Filed: Mar. 23, 1983

[30] Foreign Application Priority Data

Mar. 26, 1982 [GB] United Kingdom ............... 8209019

[51] Int. Cl.⁴ ..................... A01D 43/02; A01D 65/02; A01D 89/00
[52] U.S. Cl. ....................................... 56/364; 56/400; 56/DIG. 1
[58] Field of Search ................. 56/DIG. 1, 12.7, 364, 56/460; 130/27 N, 27 P, 27 G

[56] References Cited

U.S. PATENT DOCUMENTS

| | | | |
|---|---|---|---|
| 985 | 10/1838 | Grieb | 130/27 G |
| 1,257,592 | 2/1918 | Ek | 130/27 P |
| 2,286,095 | 6/1942 | Innis | 56/364 |
| 2,347,664 | 5/1944 | Chilton | 130/27 P |
| 2,534,681 | 12/1950 | Randall | 56/400.21 |
| 2,704,150 | 3/1955 | Scranton | 56/400 |
| 2,974,467 | 3/1961 | Long | 56/364 |
| 3,125,845 | 3/1964 | Lee | 56/364 |
| 3,126,696 | 3/1964 | Renn | 56/364 |
| 3,295,302 | 1/1967 | Lee | 56/400 |
| 3,531,927 | 10/1970 | Wood | 56/400 |
| 3,693,335 | 9/1972 | Mathews | 56/12.7 |
| 3,713,283 | 1/1973 | Fritz | 56/364 |
| 3,927,679 | 12/1975 | Ausherman | 130/27 HA |
| 3,983,883 | 10/1976 | Ashton et al. | 130/27 P |
| 4,021,995 | 5/1977 | Hill | 56/400 |
| 4,035,992 | 7/1977 | Moosbrucker et al. | 56/DIG. 1 |
| 4,182,102 | 1/1980 | Anderson et al. | 56/364 |
| 4,202,159 | 5/1980 | Young | 56/364 |
| 4,265,923 | 3/1981 | Spaida et al. | 56/364 |
| 4,312,366 | 1/1982 | DeBusschar | 130/27 P |

FOREIGN PATENT DOCUMENTS 10705 9/1880 Fed. Rep. of Germany ... 130/27 N

Primary Examiner—Paul J. Hirsch
Attorney, Agent, or Firm—Cushman, Darby & Cushman

[57] ABSTRACT

A crop engaging device for conveying and/or treating crop comprises a support means and a plurality of outwardly extending crop engaging elements. The support means may comprise a rotor with the crop engaging elements extending outwardly from the rotor center, or a stationary supporting plate with outwardly extending elements which protrude into a flow of crop driven by other means. An array of crop engaging elements is attached to a transverse support bar which is substantially transverse to the principal direction of crop flow. All the elements in the array are inclined at the same angle to the transverse support bar. Elements of succeeding bars may be inclined in opposite directions to each other or inclined in the same direction. The device finds use in crop conditioning apparatus, crop pick-up and conveying apparatus, particularly where an alignment effect is required, and grain threshing apparatus.

6 Claims, 42 Drawing Figures

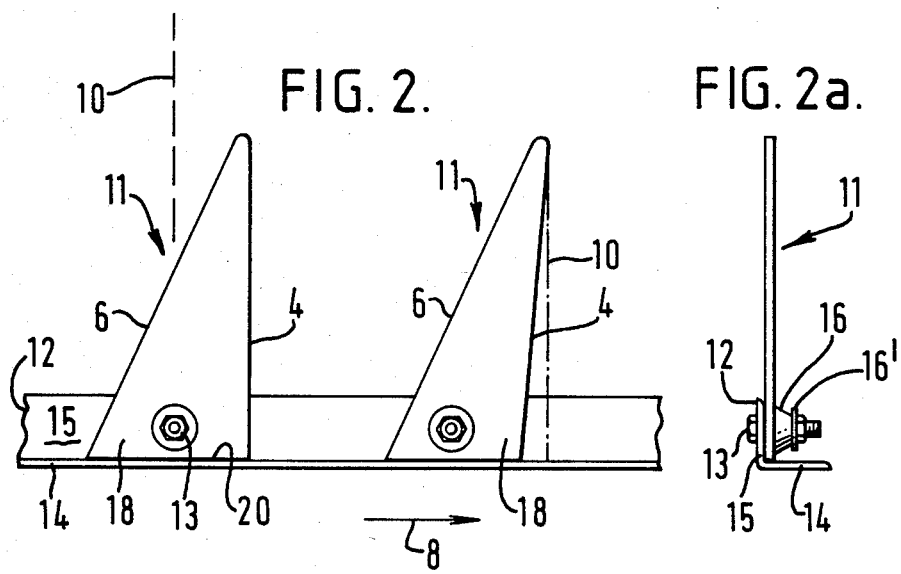
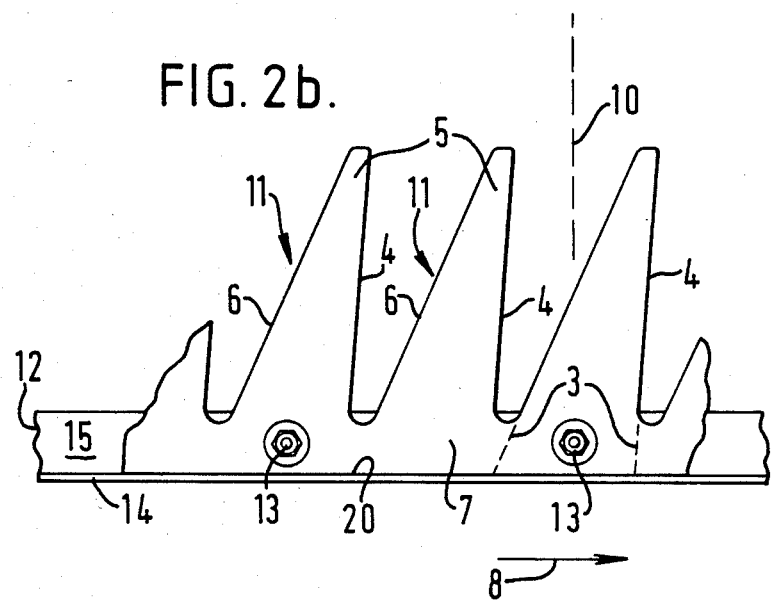

FIG. 20.
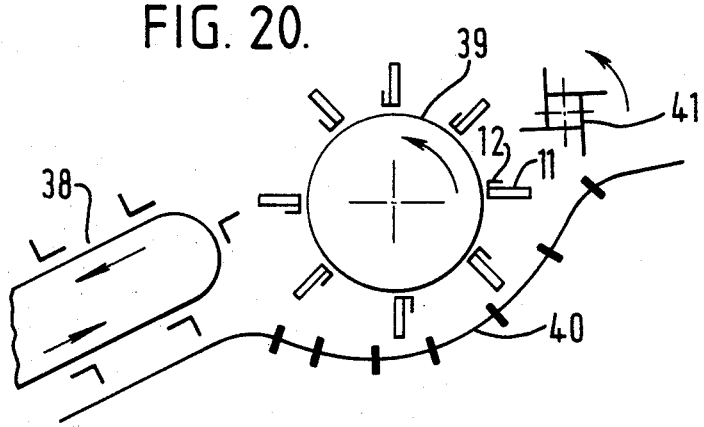
FIG. 21a.   FIG. 21b.   FIG. 21c.
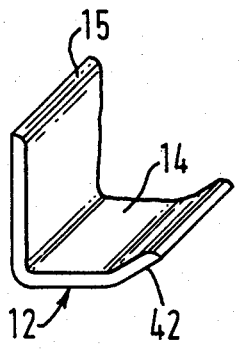 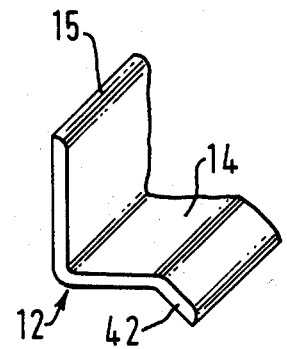 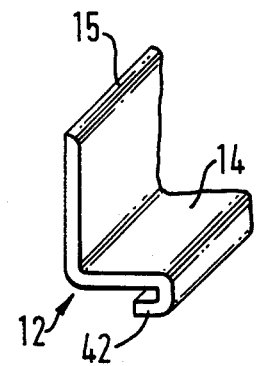

CROP ENGAGING DEVICE AND METHOD

The present invention relates to a crop engaging device and method. The invention is concerned in one aspect with apparatus for conditioning of crops especially, but not exclusively, grasses, and is concerned in other applications with picking up and conveying rotors for collecting cut crop and conveying the same, for example either back on to the ground or directly into harvesters. In a further aspect the invention is concerned with threshing grain crops.

Considering firstly the aspect of the present invention concerned with conditioning of crops, it is well known to treat forage crops such as grasses and legumes in order to assist loss of moisture in the field after cutting prior to storage to provide animal fodder. The speed at which surface and sap moisture evaporate from the cut crop during field exposure depends inter alia on the physical condition of the crop. The principal barrier to moisture loss is the cuticle and the layer of epi cuticular wax on the crop surface, and it is now common practice in agriculture to mechanically treat the crop in order to damage this barrier. Such mechanical treatment, which may take the form of crushing, lacerating, bruising, splitting, spiking, bending or scuffing the stems and leaves of the crop, is known as "conditioning".

In one aspect, it is an object of the present invention to provide an improved crop conditioning apparatus in which crop conditioning elements ensure a thorough conditioning of all crop engaged by the apparatus.

Considering a further aspect of the invention, there is a widespread requirement in agriculture to pick-up and convey cut crop, for example in collecting cut crop which has been previously cut and lies on the ground, or collecting cut crop from the rear of a mobile cutting device such as a disc or drum mower. The collected crop may be deposited on the ground in a windrow or may be passed to a harvester for chopping or baling or other form of processing. There are a number of shortcomings of conventional tine-bar type pick-up mechanisms. Because of the fixed tine spacing of existing pickups, field losses in the form of left crop stems or pieces are particularly high when the crop lying on the ground is either short, sparse or generally oriented in the direction of forward travel. It is often desirable to have some control over the movement imparted to the crop, for example to move the crop sideways, to converge the crop into a windrow, or to spread the crop out for drying, or to control the crop direction for other purposes.

In this further aspect of the invention, it is an object to provide an improved crop conveying apparatus which allows a degree of control over the orientation of the strands of a fibrous crop relative to the general direction of crop flow.

In yet a further aspect of the present invention, it is an object to provide an improved crop treating device for the purpose of removing grain and seeds, which may be used as a replacement for a conventional rasp-bar type of threshing drum.

According to the present invention there is provided a crop engaging device for conveying and/or treating crop, the device comprising support means and, secured to the support means, a plurality of outwardly extending crop engaging elements for engaging crop flowing past, or conveyed by, the device, the crop engaging elements being arranged in an array which extends in a direction transverse to the principal direction of crop flow, the elements being inclined in such a manner that when viewed along the principal direction of crop flow each outwardly extending element, or a principal crop engaging edge or region thereof, has an angle of inclination to an axis perpendicular to the said transverse direction in which the array extends, and a number of successive elements (that is to say two or more adjacent elements) along the said transverse array have the said inclinations in the same sense, each element being mounted with a preselected inclination, and each element being formed of resilient material and/or being resiliently mounted.

It will normally be arranged that the said number of successive elements which have the said inclinations in the same sense is a substantial number, for example greater than three, for example ten or twenty, although in some cases only two or three adjacent elements may be so inclined. In most arrangements embodying the invention the said successive elements along the transverse array which are inclined in the same sense constitute a group forming a substantial proportion of the total number of elements in the array, for example at least a quarter, and in many embodiments substantially half the total. Also it will often be arranged that substantially all the elements of the transverse array have the said inclinations in the same sense.

Preferably, each crop engaging element is adapted to protrude into the crop over at least half its free length, and preferably protrudes into the crop over all its free length.

It is preferred that in normal operation the said direction in which the transverse array extends lies substantially at right angles to the principal direction of crop flow, but this may be changed to a certain extent by the introduction of guide vanes to the underside of the rotor cover, to direct the crop towards or away from the rotor centre.

Conveniently each said inclined element lies in a plane containing the said transverse direction in which the array extends and containing the said axis perpendicular to the direction in which the array extends.

Thus in most arrangements each said inclined element will lie in the plane containing the said transverse direction in which the array extends, which plane will normally be at right angles to the principal direction of crop flow.

However it is to be appreciated that many variations in the inclination of the crop engaging elements may be arranged. For example it may be arranged that each said inclined element lies in a plane inclined to a plane perpendicular to the principal direction of crop flow. Where for example the said transverse array extends transversely in a direction which lies substantially at right angles to the principal direction of crop flow, the inclined elements may be inclined not only in the plane perpendicular to the direction of crop flow, but may also protrude forwardly into the crop flow, or may trail rearwardly relative to the crop flow.

In one preferred form, each crop engaging element comprises a discrete arm. Conveniently the element is a flat strip of stiff resilient material, for example synthetic plastics material, and the element may be arranged to be yieldable either by virtue of the resilience of the material itself, and/or by virtue of a resilient mounting means which allows pivoting, rocking and/or twisting.

In some forms of the invention, each crop engaging element may comprise a triangular, parallelogram shaped, or trapezoidal projection formed from flat sheet-like material and secured to the support means with the flat face of the element transverse to the direction of crop flow. In all these arrangements each element has a principal crop engaging edge or region which is inclined to an axis perpendicular to the said direction in which the array extends transverse to the crop flow.

Each projection may have a principal crop engaging edge formed by one side edge of the projection and inclined to the said perpendicular axis, and a second side edge which is inclined to the said axis in the same sense, or is parallel to the said axis, or is inclined to the said axis in the opposite sense to the principal crop engaging edge of the projection but is inclined at a lesser angle than is the principal crop engaging edge of the projection.

In some preferred forms a number of successive elements along the said transverse array comprise outwardly extending projections extending from a common base portion secured to the support means.

In another preferred form, the crop engaging elements form a brush like structure of stiff, resilient elongate elements, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

Such a brush like structure may take any of the forms set out in our published UK Patent Applications Nos. 8012426 and 8121637.

It is particularly preferred in this form that the elements are arranged in spaced apart tufts of elements and in which each tuft is formed of one or more lengths of element material doubled over and secured to a supporting base in the region of the fold of the doubled over element length or lengths, each group of elements in a tuft being supported and protected at the base thereof by a sleeve of resilient material. In such a case conveniently each tuft as a whole, together with its sleeve of resilient material, is inclined in the required manner relative to the specified directions.

Conveniently the said support means is arranged both to support the conditioning elements, and also to afford protection against damage by stones and like objects in the crop. Preferably the said support means comprises a base to which the crop engaging element is secured and an upstanding shielding portion positioned ahead of the element relative to movement between the crop and the element in operation, for the purpose of shielding the base of the element against damage by stones and like foreign matter in the crop.

The invention finds particular but not exclusive application where the said elements are made of stiff resilient material, for example synthetic plastics material, conveniently nylon, polypropylene or polyethylene, or of spring steel, although rigid non-resilient material may be used.

Considering again the configuration and arrangement of the crop engaging device as a whole, conveniently the elements are arranged in a series of transverse arrays, conveniently a series of linear transverse arrays, each transverse array being spaced from its adjacent transverse array along the said principal direction of crop flow, or around a rotor which has an axis of rotation transverse to the said principal direction of crop flow.

In one form of such an arrangement, succeeding transverse arrays which are presented to the crop have the angles of inclination of the elements such that the prevailing sense of inclination of one linear transverse array is opposite to the prevailing sense of inclination of the next succeeding transverse array. Such an arrangement is particularly convenient where the device is adapted to convey and/or treat fibrous crop in which the spacing and inclinations of the elements are arranged to produce a prevailing alignment of the strands of the crop generally in line with to the principal direction of crop flow.

In another form of the overall arrangement set out above, it may be arranged that succeeding transverse arrays which are presented to the crop have the angles of inclinations of the elements such that the prevailing sense of inclination of one transverse array is the same as the prevailing sense of inclination of the next succeeding transverse array. Such an arrangement is particularly useful where the device as a whole is adapted to convey and/or treat fibrous crop in which the spacing and inclinations of the elements are arranged to produce a prevailing alignment of the strands of the crop generally transverse to the principal direction of crop flow.

A crop engaging device according to the invention finds application either when in the form of a vertical or horizontal rotor for conveying and/or treating crop by rotation of the rotor, or when in the form of a stationary device positioned adjacent a crop flow so as to treat crop being propelled past the device by other means. In particular, the plurality of crop engaging elements may be arranged in more than one array, for example with two arrays formed on rotors positioned opposite each other so that crop passes between the two rotors and is engaged by elements of both rotors. In another comparable arrangement, one array of the elements is formed on a rotor, and another array of the elements is formed on a stationary crop engaging device positioned opposite one face of the rotor.

In accordance with one particular feature of the present invention, the plurality of elements is arranged with elements of one array extending into a crop flow from one side of the crop flow and elements of another array opposite to the first array extending into the crop flow from an opposite side of the crop flow, the prevailing direction of inclination of the first array of elements being opposite to the prevailing direction of inclination of the second array in the region of the crop flow so that when viewed along the principal direction of crop flow a herringbone pattern of elements is presented to the crop. Such an arrangement is particularly useful where the device is adapted to convey and/or treat fibrous crop in which the spacing and inclinations of the elements are arranged to produce a prevailing alignment of the strands of the crop transverse to the principal direction of crop flow.

In another form it is a particular feature of the invention that there may be provided an arrangement in which the plurality of elements is arranged with elements of one array extending into a crop flow from one side of the crop flow and elements of another array opposite to the first array extending into the crop flow from an opposite side of the crop flow, the prevailing direction of inclination of the first array of elements being the same as the prevailing direction of inclination of the second array so that when viewed along the principal direction of crop flow a pattern of elements is presented to the crop with the majority of elements of both arrays aligned in substantially the same directions. Such an arrangement is particularly useful where the device is adapted to convey and/or treat fibrous crop in which the spacing and inclinations of the elements are arranged to produce a prevailing alignment of the strands of the crop in line with the principal direction of crop flow.

Thus considering the case where two parallel rotors are provided, when in the overlap zone, or closest adjacent region, of the two rotors the inclined elements extend in planes which are broadly parallel to each other, then the crop is generally aligned in the direction of flow. When the inclined elements extend in planes which are inclined to each other in opposite directions, then the crop is generally aligned transverse to the direction of flow.

Crop engaging devices embodying the invention may be provided which are applicable to conditioning, tedding, turning, scoring, fibrillating, threshing or otherwise treating crops.

Considering the general arrangement and function of the crop engaging elements of the invention, it is preferred that the elements are such as to convey and/or treat the crop substantially without any cutting action, that is to say that the elements are now sharpened in any way, and are not mounted and arranged so as to inflect any substantial cutting action.

It is preferred that the crop engaging elements are mounted so as to protrude into the crop flow or crop stream over at least half the free length of the elements, and preferably over the entire free lengths of the elements.

In normal operation, where the crop engaging elements are mounted on a rotor, means will be provided for rotating the rotor at a speed such that the crop engaging elements move relative to the crop, at least at the main operational contact, at a relative speed greater than 10 meters per second, preferably greater than 15 meters per second.

There is also provided in accordance with the present invention a method of conveying and/or treating crop comprising the steps of engaging the crop by a plurality of crop engaging elements extending into a crop flow which is flowing past or conveyed by the crop engaging elements, producing the said crop flow in a principal direction transverse to an array of the said crop engaging elements, engaging the crop by the elements at an inclined angle such that when viewed along the principal direction of crop flow each element, or a principal crop engaging edge or region thereof, has an angle of inclination to an axis perpendicular to the said direction in which the array extends, and engaging the crop by a number of successive elements along the said array which have the said inclinations in the same sense, each element being mounted with a preselected inclination, and each element being formed of resilient material and/or being resiliently mounted.

In general, preferred and optional features of the invention which have been set out in connection with the apparatus aspect of the invention, may also be provided in accordance, with the method aspect of the invention.

Embodiments of the present invention find application in three main areas. In a first aspect, the device finds application when incorporated in apparatus for conditioning crop, the spacing and inclinations of the elements being arranged to condition the crop by a spiking and/or abrasive action, such as to ensure a thorough conditioning of all crops engaged by the apparatus.

Another area of application of the invention arises when the device is incorporated in apparatus for picking up and conveying cut, fibrous crop for chopping, baling, or other forms of processing the spacing and inclinations of the elements being arranged to align the strands of the fibrous crop in a manner to facilitate the crop chopping and/or baling.

As has been mentioned, embodiments of the invention can take the form of a single rotor, or two intermeshing rotors, inter alia. Evidence has been found that a distinct transverse crop aligning effect is achieved if all elements on one rotor are inclined in the same direction. The same applies to two intermeshing rotors with inclined elements, provided that in the overlap zone the elements of the two rotors form a herringbone pattern when viewed along the principal direction of crop movement, that is to say when taken as a transverse cross-section. If, however, when viewed in the same direction, the elements of opposing rotors lie in parallel or identical planes to each other, then the crop will be scrambled in the sense of being to a degree randomly oriented, but will be aligned overall in a principally longitudinal direction along the direction of crop flow. Similar effects can be achieved from a single rotor if circumferentially spaced, successive rows of elements are inclined, in the first case, in identical directions, or in the second, in opposite directions.

The importance of being able to control crop alignment in this simple way is related to the two main types of mechanism used for collecting and chopping pre-cut crop. With all cylinder and flywheel type choppers, it is preferable that the herbage material is fed into the mechanism longitudinally, that is to say with the strands of the fibrous material aligned generally along the principal direction of crop flow, so that the bulk of the stems lie as nearly as possible at right angles to the cutting edges of the knives. Conversely, transverse alignment of the fibrous crop relative to the crop flow direction is beneficial where the cutting knives are arranged in the direction of crop flow, as for example in pick-up loader wagons and in certain forms of crop column slicing mechanisms.

It will be appreciated that the alignment effects mentioned may be obtained by conditioners or mower conditioners used to treat the crop prior to harvesting it with machines employing conventional pick-up mechanisms, or by pick-up rotors embodying the invention when fitted directly to the harvesting machines. That is to say that the crop alignment can be applied to crop which has already been picked up by other means, or the crop alignment treatment may be carried out at the same time that the crop is picked up by a rotor embodying the invention.

Considering now a third principal area of application of the present invention, this arises where the device is incorporated in apparatus for threshing crop in which the spacing and inclinations of the elements are arranged in such a manner that elements penetrate the crop flow stream and exert the required rubbing effect on substantially all the grain bearing parts of the crop.

In this aspect, rotors with inclined elements may be used as a replacement for conventional rasp-bar type of threshing drums. Three serious disadvantages of the latter are that it is difficult to protect them effectively against damage by foreign objects, that they maintain a high level of density in the crop stream being treated and that the rubbing effect they have on the grain-bearing parts of the straw does not always penetrate sufficiently deeply, particularly in modern high capacity combines of conventional design with very wide cutting tables. By contrast, it is possible in accordance with the present invention to provide a rotor having impact-protected elements which intrude into the crop layer, the extent depending upon the angle of inclination of the elements to the transverse axis.

In the threshing application of the present invention, one particularly preferred arrangement has rotors with opposite handed arrays of elements, that is to say with successive arrays having the predominant inclinations thereof in opposite senses. The advantage of such an arrangement is that this configuration of threshing rotor imparts a lateral shaking effect to the crop. This keeps the crop layer loose and promotes effective separation of free grain from the straw mass.

Embodiments of the present invention will now be described by way of example with reference to the accompanying drawings, in which.

Figure 3:
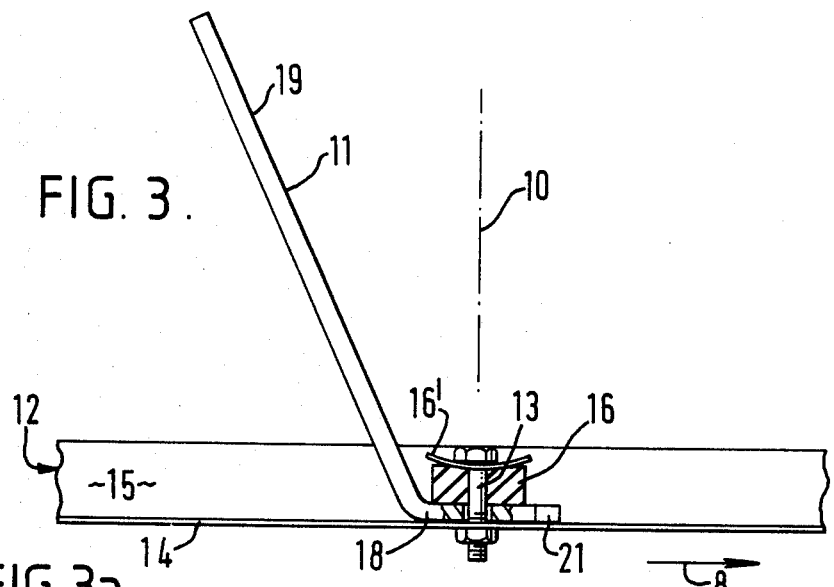
Figure 3A:
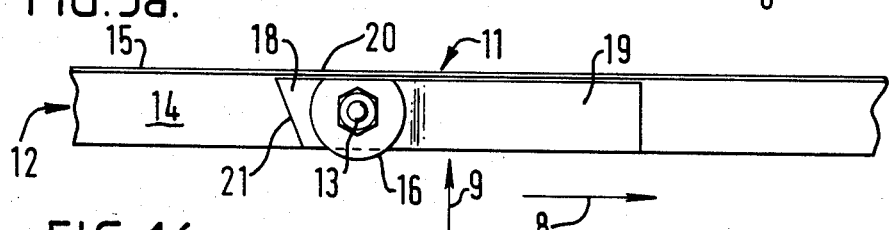
Figure 16:
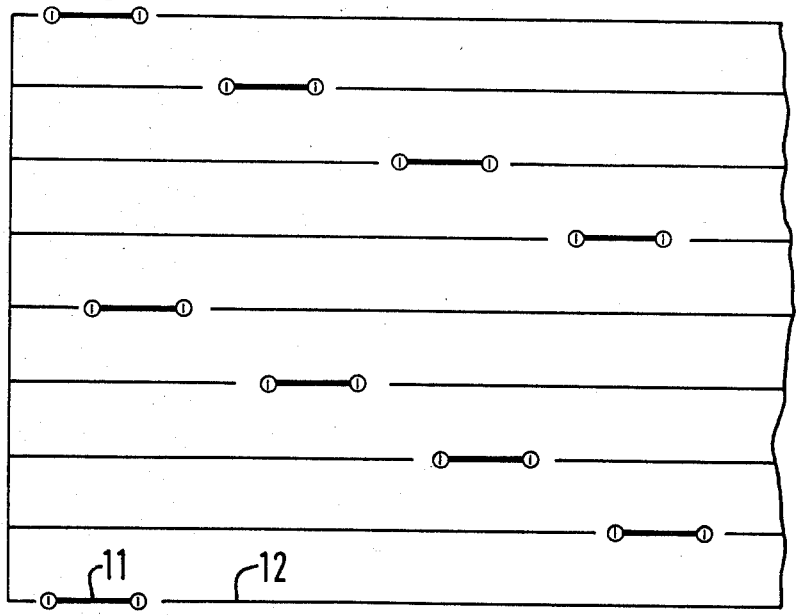
Figure 4:
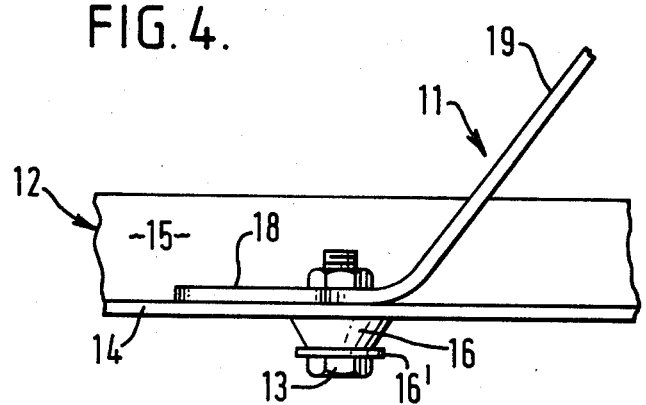
Figure 4A:
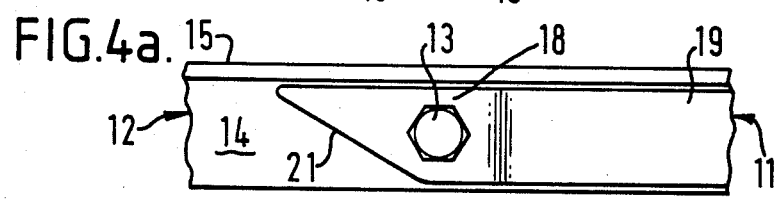
Figure 4B:
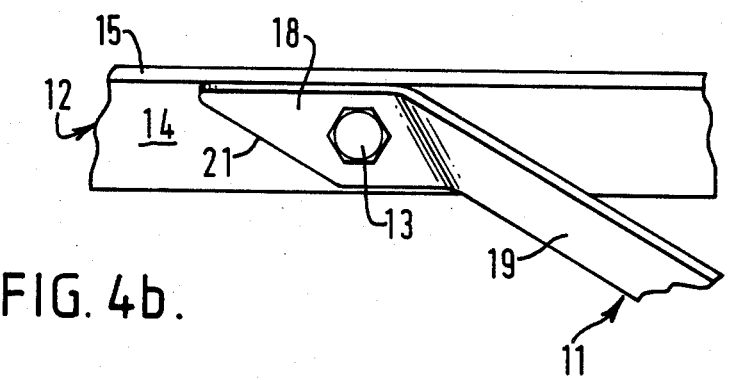
Figure 5B:
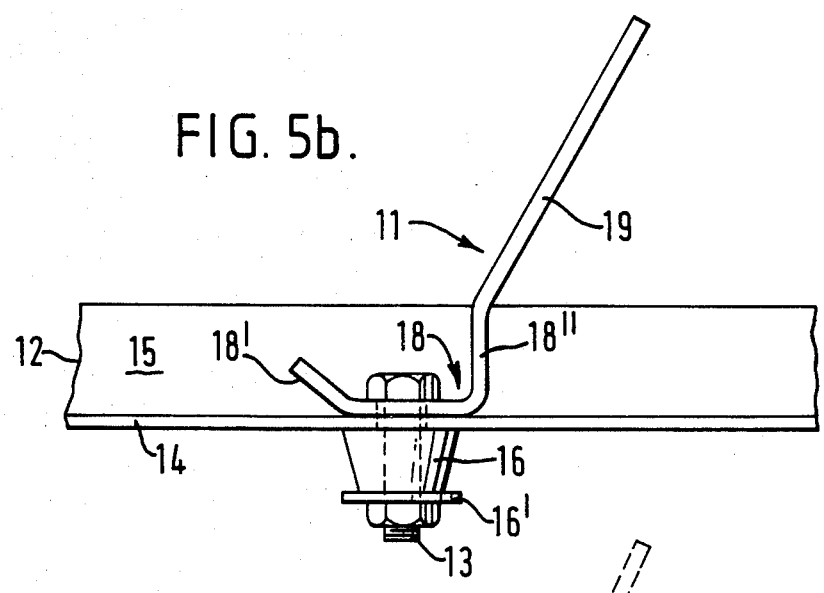
Figure 5:
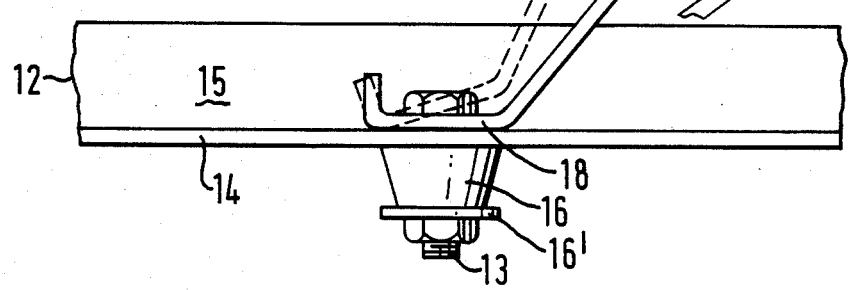
Figure 5A:
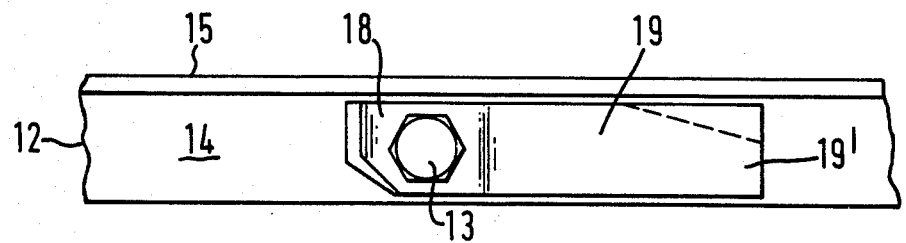
Figure 6:
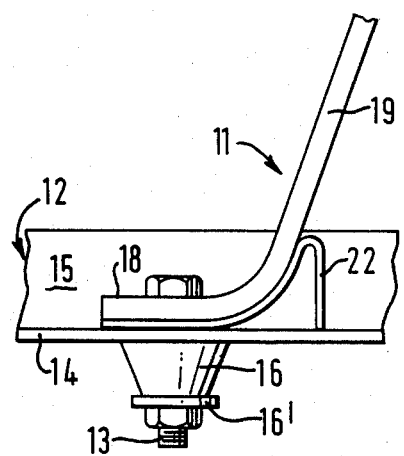
Figure 7:
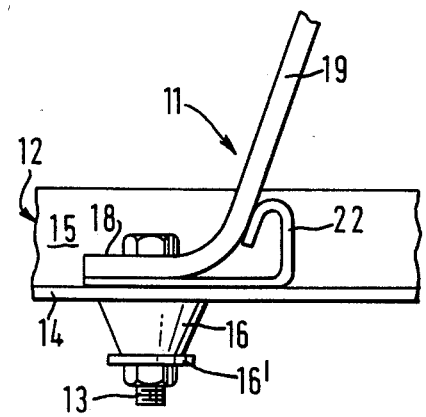
Figure 8:
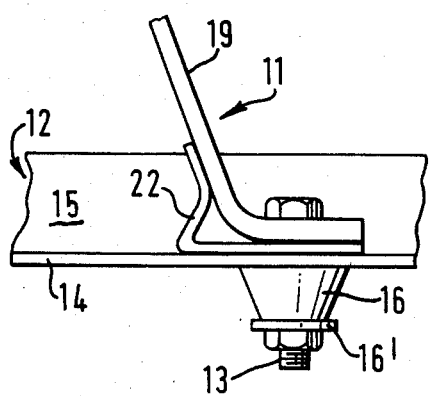
Figure 9:
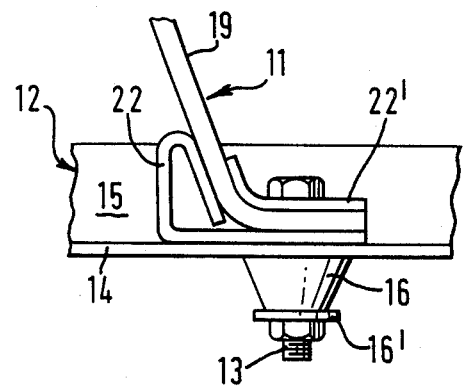
Figure 10:
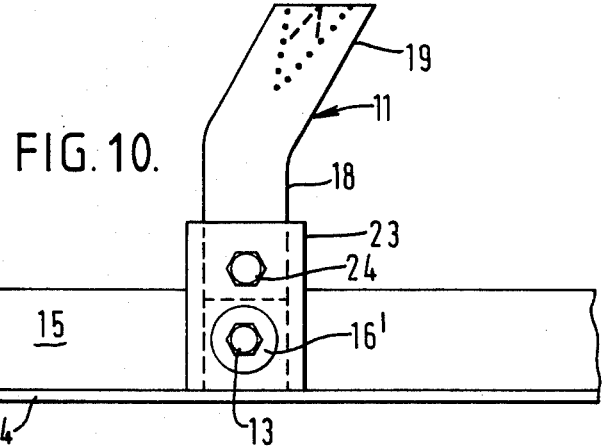
Figure 10A:
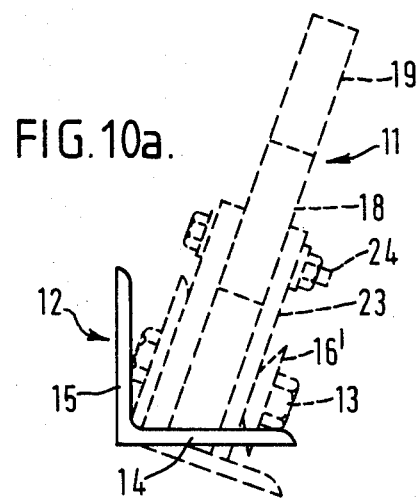
Figure 11:
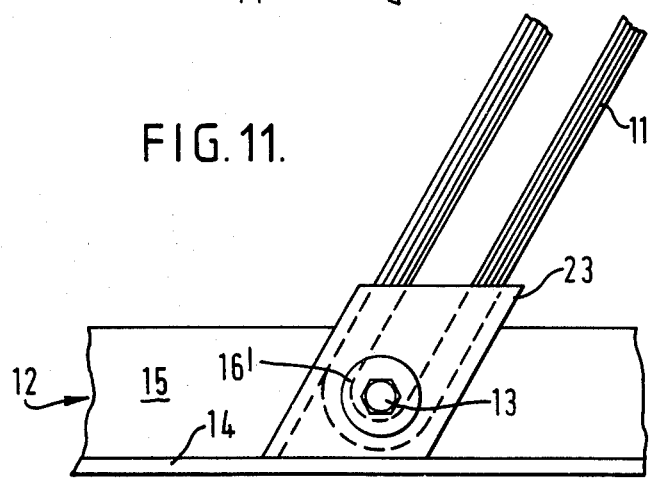
Figure 12:
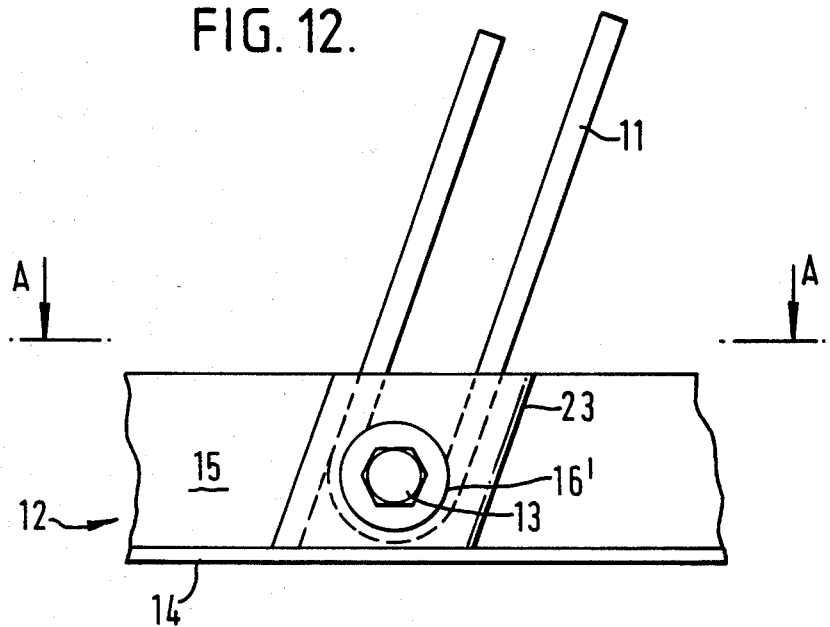
Figure 12A:
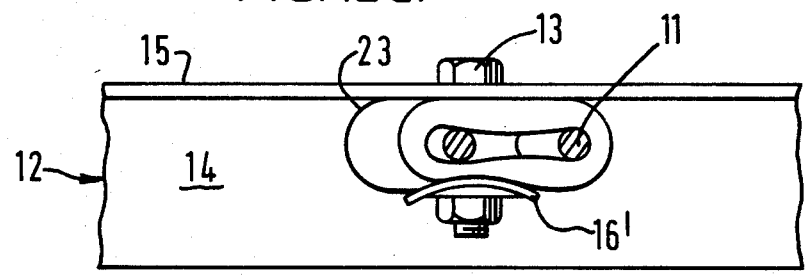
Figure 12B:
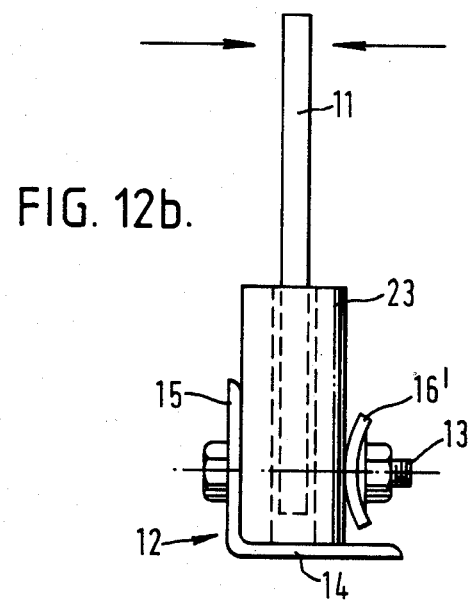
Figure 12C:
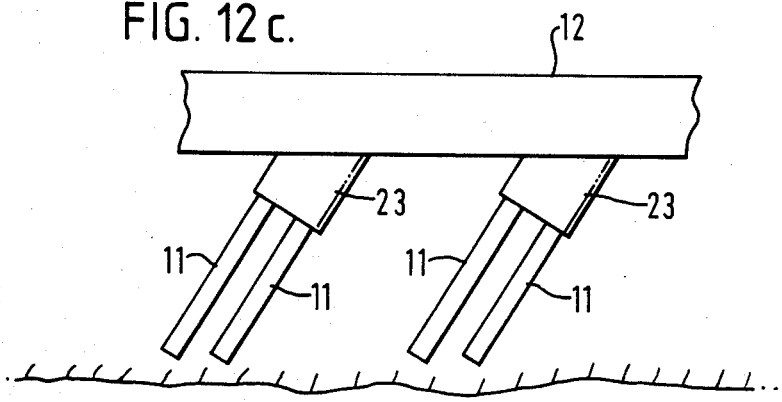
Figure 12D:
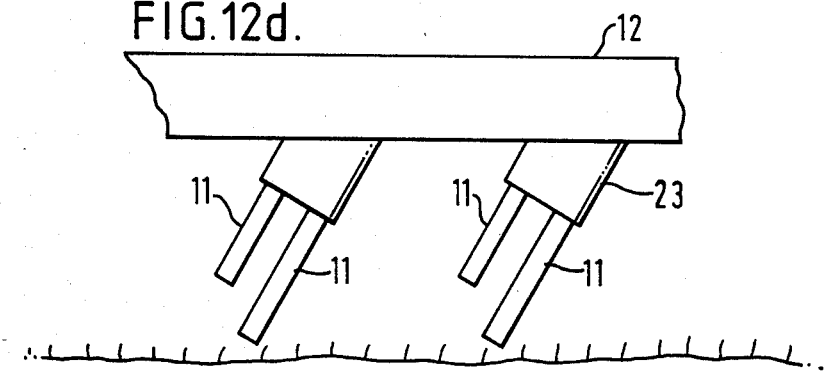
Figure 13:
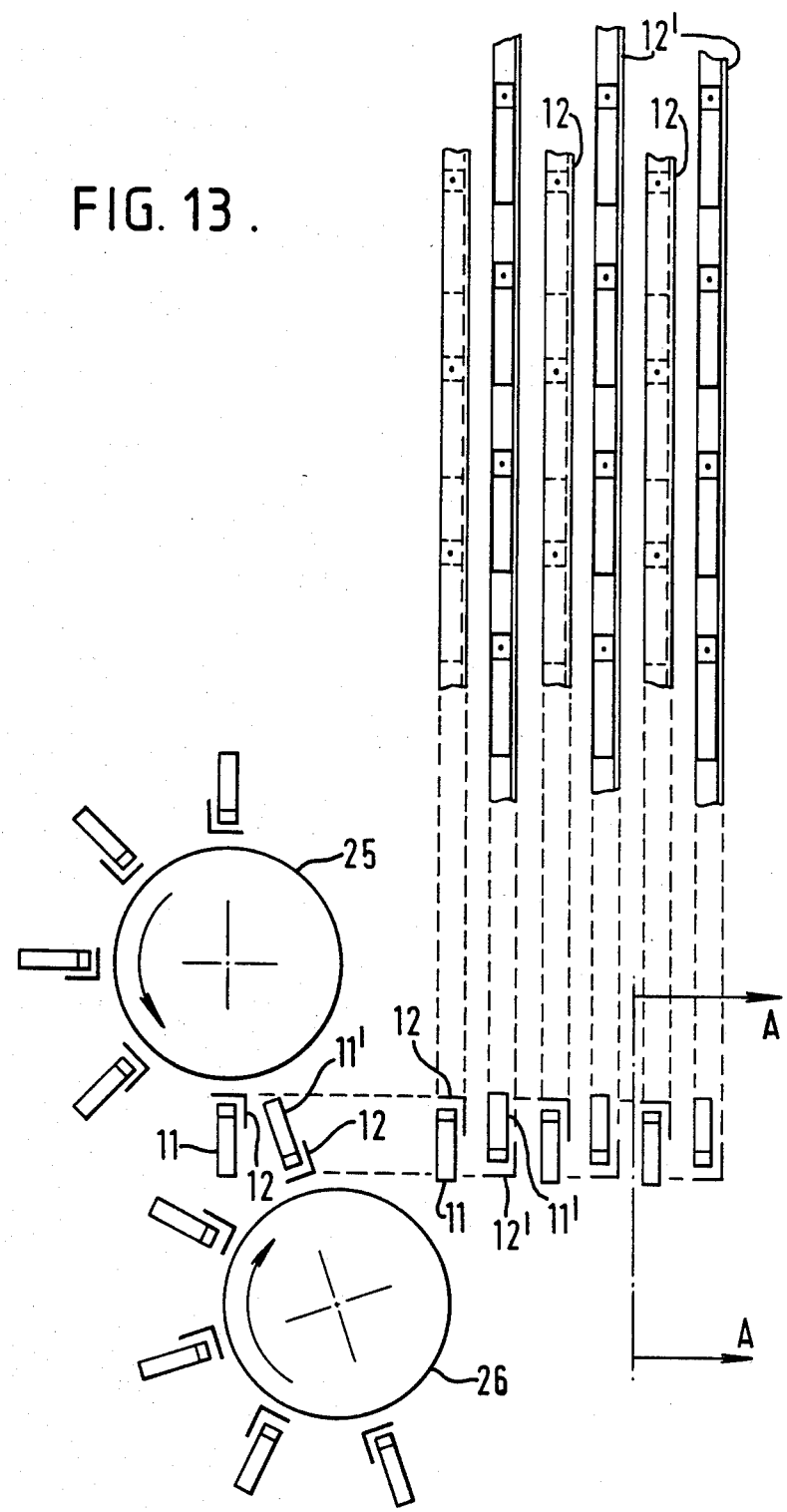
Figure 14:
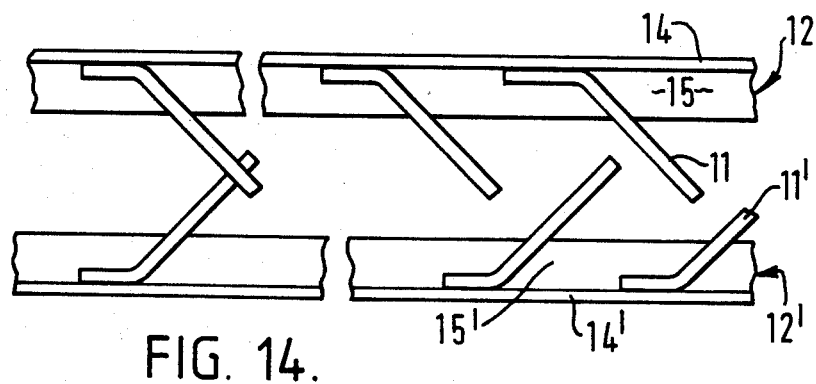
Figure 15:
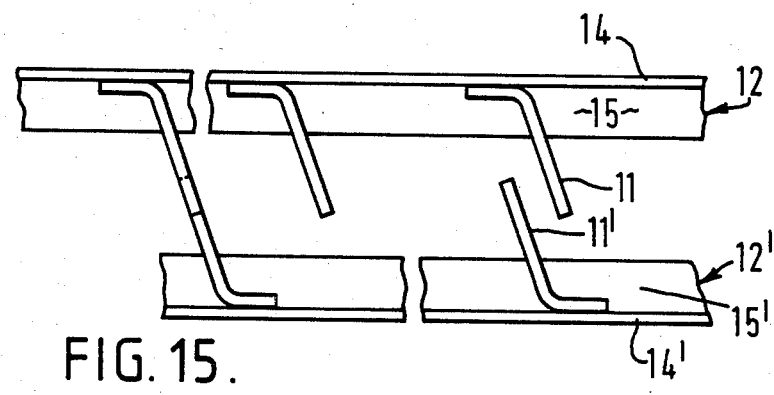
Figure 15A:
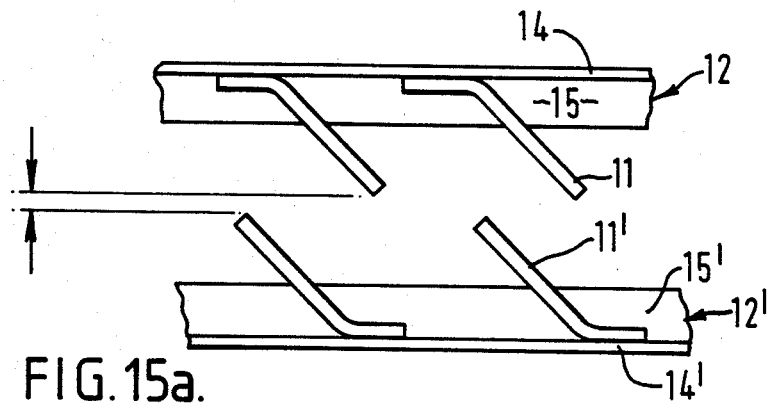
Figure 17:
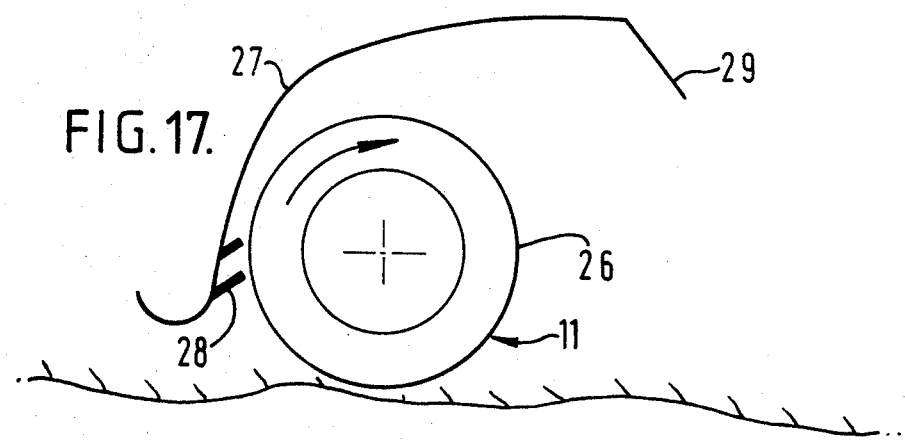
Figure 17A:
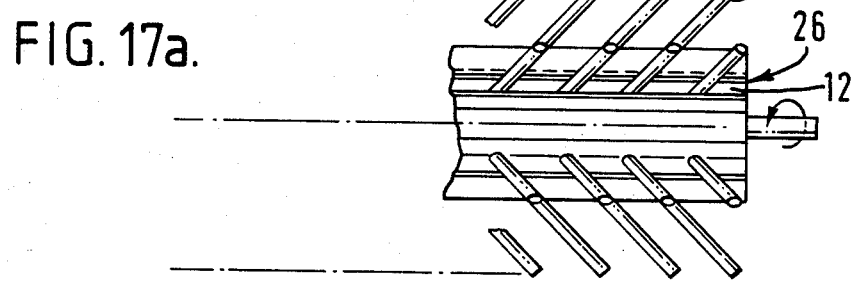
Figure 17B:
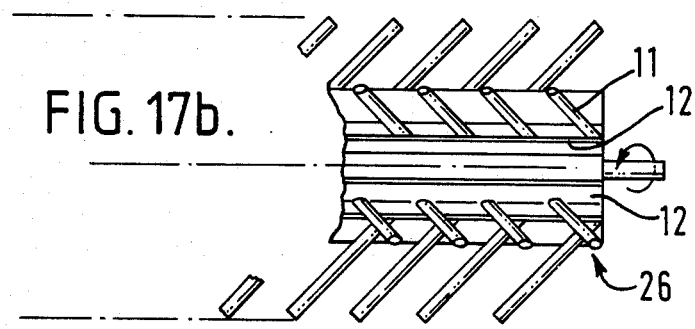
Figure 18:
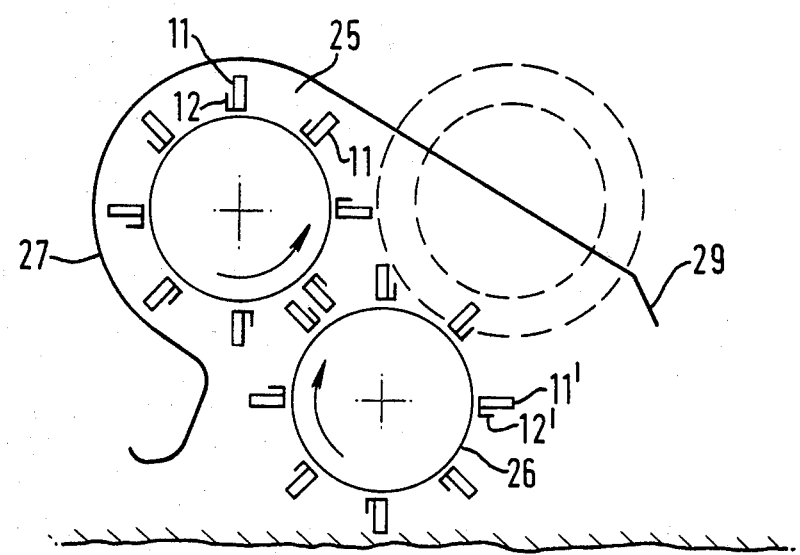
Figure 19:
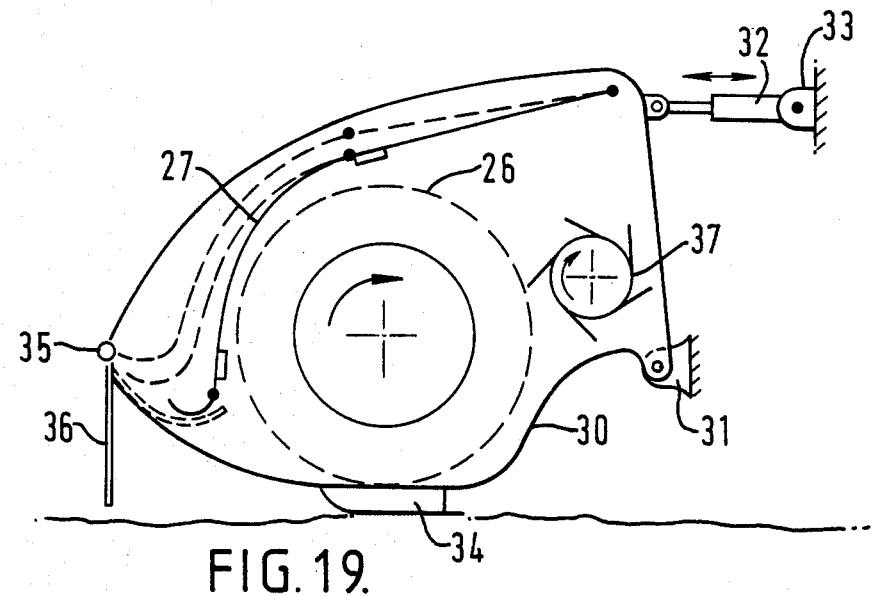

FIGS. 2(b) (c) and (d) are rear views of modifications of the embodiment shown in FIGS. 2 and 2(a);

FIG. 3 shows a rear view of another form of a single crop engaging element embodying the invention;

FIG. 3(a) shows a plan view of an element such as shown in FIG. 3, but of opposite hand;

FIG. 4 shows a rear view of an alternative element to that shown in FIG. 3;

FIG. 4a is a plan view of the element shown in FIG. 4;

FIG. 4b is a plan view of an alternative modified element similar to that shown in FIG. 4;

FIG. 5 is a rear view of a further modified element generally similar to that shown in FIG. 4;

FIG. 5a is a plan view of the element shown in FIG. 5;

FIG. 5b is a rear view of a modification of the element shown in FIG. 5;

FIGS. 6 to 9 show further modified crop engaging elements embodying the invention, all in rear view, and illustrate crop engaging elements formed of semi-rigid strip material;

FIGS. 10 and 10a show rear and side view respectively of a further alternative form of crop engaging element, suitable for manufacture from plastics material and for use in a pick-up rotor;

FIG. 11 shows a rear view of a further form of crop engaging element, comprising a tuft of elements forming part of a brush like structure;

FIGS. 12, 12a and 12b show rear plan and side view respectively of a further modified crop engaging element embodying the invention suitable for manufacture of plastics material;

FIGS. 12c and 12d show alternative forms of the crop engaging elements shown in FIG. 12, the views being from the front;

FIG. 13 shows a cross-sectional diagrammatic view of an arrangement of crop engaging elements embodying the invention on two intermeshing crop moving rotors;

FIG. 14 is a cross-sectional view along the lines A—A in FIG. 13;

FIG. 15 shows a cross-sectional view which would be taken along the line AA in FIG. 13 if the direction of elements were reversed on one rotor;

FIG. 15a shows a view similar to that of FIG. 15, where the elements on one rotor are staggered axially and spaced further apart, in comparison with the view shown in FIG. 15;

FIG. 16 is a part development of a rotor embodying the invention showing one other range of mounting patterns;

FIG. 17 is a diagrammatic side view of a single rotor embodying the present invention and acting as a conditioning or pick-up rotor;

FIG. 17a is a diagrammatic plan view of one form of rotor to be used as shown in FIG. 17;

FIG. 17b is a diagrammatic plan view of an alternative form of rotor to that shown in FIG. 17a;

FIG. 18 is a diagrammatic side view of a twin intermeshing rotor conditioner embodying the present invention;

FIG. 19 is a diagrammatic side view of a pick-up header for a forage harvester, self-loading forage waggon, or baling machine;

FIG. 20 is a diagrammatic cross-sectional view of the threshing portion of a threshing machine or combine-harvester; and FIGS. 21a, 21b and 21c are perspective views of three alternative forms of mounting bar suitable for use with crop engaging elements embodying the invention.

Figure 1:
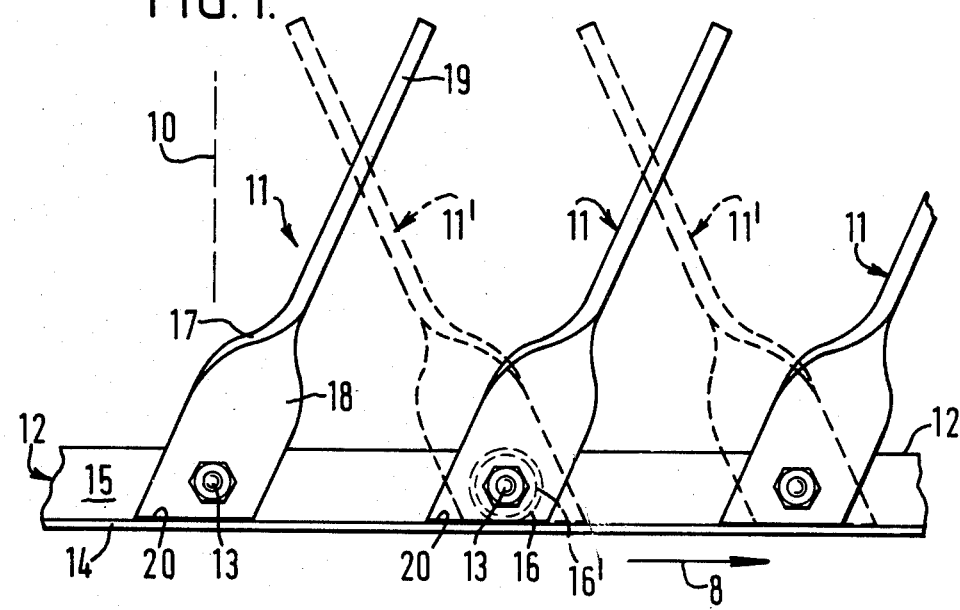
FIGS. 1 and 1(a) are rear and plan views respectively of part of a crop engaging device embodying the invention.
Figure 1A:
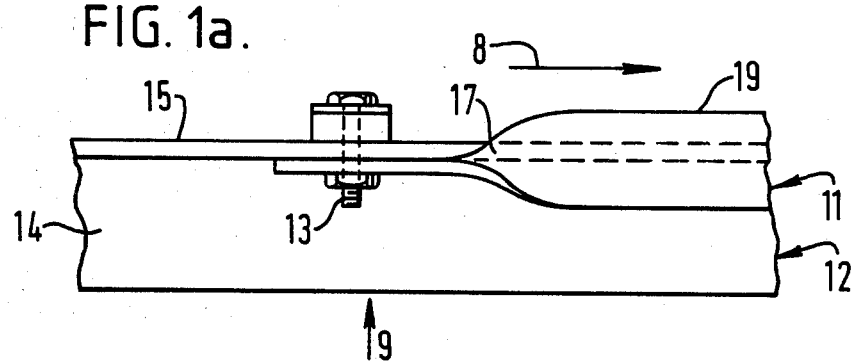
Figure 1B:
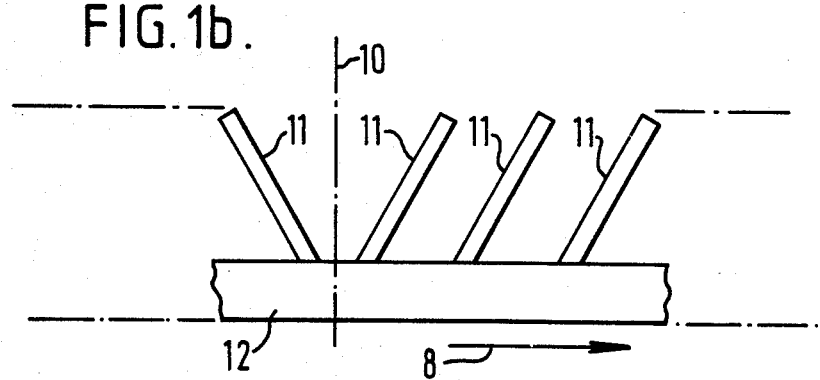
FIG. 1(b) is a diagrammatic representation showing a change of direction of an array of a crop engaging device embodying the invention.

Referring firstly to FIGS. 1 and 1(a), there is shown in rear view part of an array (extending in a direction 8) of crop engaging elements 11 embodying the invention, secured to a transverse mounting bar 12 by bolts 13. In full lines in the Figure are shown elements 11 bolted to the mounting bar 12, and in dotted lines are shown elements 11' which are mounted on a second mounting bar (not shown) which is spaced from the first bar along the direction 9 of travel of the crop, which is generally in a direction perpendicular to the plane of FIG. 1.

The mounting bar 12 comprises a right angle section bar having an upstanding leading flange 15 and a base flange 14 perpendicular to the flange 15. Where the crop engaging element 11 is formed of resilient material, for example thick stiff resilient plastics material, the element can be bolted directed to the leading flange 15 by a simple nut and bolt arrangement with suitable washers. Where the element 11 is made of rigid material such as steel, the element is mounted by the bolt 13 passing through a resilient component such as a compression spring, or a rubber cone, which is indicated in dotted lines at 16. The middle element shown in FIG. 1 is an alternative to the left and right elements 11 in FIG. 1, and would not normally be mounted on the same mounting bar. Details of such flexible arrangements for the crop engaging elements will be described in more detail hereinafter.

Each crop engaging element 11 comprises a base portion 18 and a crop engaging portion 19, formed by a flat elongate strip which is twisted through an angle of 90° at a region indicated at 17, closer to the fastening means 13 than to the distal end of the element 11. The base portion 18 of the element 11 below the twist 17 is secured to the flange 15 by the bolt 13, and terminates in an edge 20 which is cut at a slanting angle to the general longitudinal axis of the element 11, and abuts firmly against the flange 14 of the angle bar 12. Such an arrangement prevents or inhibits rotation of the element 11 about the axis of the fastening means 13. In the case of the centre element 11 fastened by the resilient mounting means 16, the abutment of the surface 20 against the flange 14 prevents rotation about the bolt 13, but allows rear-ward movement of the element 11 upon striking an object heavier than crop, by a rearward pivoting action about the edge 20, upon compression of the resilient mounting means 16. This resilient component can be introduced at the leading or trailing end of the mounting bolt 13 as will become apparent from description hereinafter.

To increase the resistance of elements 11 to rotation in the clockwise sense, the holes for mounting bolt 13 may be drilled off-centre to the left and/or lower than shown. For elements 11' the holes would be displaced similarly but to the right of centre, as viewed in the figure.

As will be seen from FIGS. 1 and 1(a), the crop engaging elements 11 mounted on the bar 12 are arrange in an array which extends in a direction 8 substantially transverse to the principal direction 9 of crop flow, that is to say along the axis of the elongate support member 12, the elements being inclined in such a manner that when viewed along the principal direction 9 of crop flow, that is to say perpendicular to the plane of FIG. 1, each element 11 has an angle of inclination to an axis (indicated at 10) which is perpendicular to the transverse direction 8 in which the array extends, and in the case shown, all the elements in the one transverse array along the mounting bar 12, are inclined in the same sense. In the particular embodiment shown, not only are the elements inclined in the same sense, but are actually all inclined at the same angle, which may be approximately 15° to the axis 10.

One feature of the arrangement shown in FIG. 1, is that where the elements 11 are used for conditioning purposes, and the direction of inclination of all the elements is the same on every other bar, and in the opposite direction on intermediate bars, then in effect the V-configuration which is known to be of advantage in conditioning (see for example our previous UK Patent Nos. 1322165 and 1493574) will be achieved so far as the crop is concerned in the same way as if each conditioning element has a V-shaped configuration. Advantages of achieving this V-shape by succeeding arrays of elements inclined in one direction only along each array are simplicity, cheapness, and the ability to obtain greater population densities of conditioning elements than has been previously available.

As is shown, where pairs of successive elements cross, the enclosed angle is approximately 30°, but, according to the intended application of the crop engaging rotor, the mounting angles may be larger or smaller. The ends of the elements are cut at the edge 20 so that they engage firmly with the flat web 14 of the mounting bar, and the set angle is maintained. Elements made of rigid material and resiliently mounted can only rock to and fro about the edge 20, but elements made of resilient material are able to bend laterally along their lengths also.

FIG. 1a illustrates that, particularly in the case of a very wide rotor configuration, the direction of inclination of the elements on individual mounting bars 12 need not necessarily be the same across the full width of each bar, but may be reversed in the centre or at desired intervals. In such a case the array which has been referred to as having at least the majority of elements inclined in the same sense, may be regarded as a group of elements along the mounting bar between changes of direction of inclination. The gap between adjacent elements 11 in the vertical centre region will be covered by elements inclined in opposite directions in subsequent arrays.

FIGS. 2 and 2(a) show rear and side views respectively of an alternative embodiment of the invention comprising part of an array of crop engaging elements 11 and components which corresponds to components shown in previous figures are referred to by like reference numerals. However the crop engaging elements 11 shown in FIGS. 2 and 2(a) differ from those shown in the previous figures in an important aspect, which is that the elements 11 in FIG. 2 are not discrete arms in the sense of elongate parallel sided, inclined arms, but are triangular projections extending outwardly from the mounting bar 12. Two different kinds of element 11 are shown in FIG. 2. The left element 11 consist of a triangular sheet of material having a base edge 20 abutting the base trailing flange of the mounting bar 12, and having two side edges 6 and 4 inclined to each other to form the outwardly extending projection. The side edge 4 is perpendicular to the flange 14, and the edge 6 constitutes a principal crop engaging edge or region, which is inclined to the axis 10 perpendicular to the transverse direction 8 of the array. A plurality of the elements 11 are provided along the mounting bar 12, each having a principal crop engaging edge or region 6 which is inclined in the same sense.

In the modification of the right-hand element 11 in FIG. 2, the side edge 4 is also inclined to the axis 10, and is inclined in the same sense as the principal crop engaging edge or region 6.

Conveniently the elements 11 of FIG. 2 can be formed of a sheet of thick stiff resilient material such as synthetic plastics material, and where the material is itself resilient, the element 11 can be bolted directly to the upstanding flange 15 of the mounting bar 12. However in some cases the elements 11 can be formed of non-resilient material such as metal, and in such a case the element is resiliently mounted, for example as shown in FIG. 2(a) by a retaining bolt 13 passing through a rubber bush 16 and metal washer 16', to allow pivoting of the element 11 rearwardly in response to excess load on the element.

Where a right-angled triangle is used as shown in the left-element 11, the attachment hole for the bolt 13 is positioned approximately central of the base portion 18, but with an acute triangle as shown on the right-hand side, the bolt 13 is positioned offset from the centre of the base region 18, offset towards the principal crop engaging edge 6.

In FIG. 2(b) there is shown a modification of the embodiment of FIGS. 2 and 2(a). In the modification of FIG. 2(b) each of the crop engaging elements 11 consists of an outwardly extending projection 5 extending from a common base 7 which is secured to the mounting bar 12 by bolts 13. In such an arrangement, preferably the material of the elements 11 is resilient material, allowing individual elements 11 to bend rearwardly in response to excess load, but instead, or in addition, the bolts 13 may pass through rubber bushes, or springs, as has been shown in FIG. 2(a), to allow the whole set of elements 11 to pivot rearwardly with their common base 7, in response to excess load. In effect the elements 11 together with the common base 7 form a transverse rib, and the section of rib may vary in width up to the full width of the rotor.

By way of example of dimensions which may be used in the embodiments shown in FIG. 2(b), the following are given:

| | |
|---|---|
| Thickness of sheet material forming elements 11 | 5 to 6 mm |
| Angle between principal crop engaging edge 6 and axis 10 | 25° |
| Width of crop engaging element 11 in direction 8, at outer tip | 10 mm |
| Notional width of crop engaging element 11 at edge 20 (indicated by dashed lines 3) | 75 mm |
| Length of crop engaging element 11 from edge 20 to outer tip of element 11 | 180 mm |
| Depth of each flange 14 or 15 of support bar 12 | 40 mm |

Figure 2C:
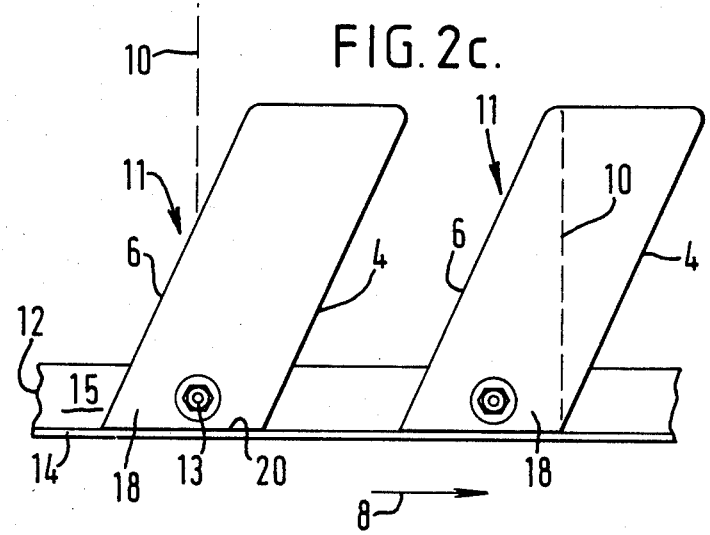
FIGS. 2 and 2(a) are rear and side views respectively of a part of an alternative crop engaging device embodying the invention.
Figure 2D:
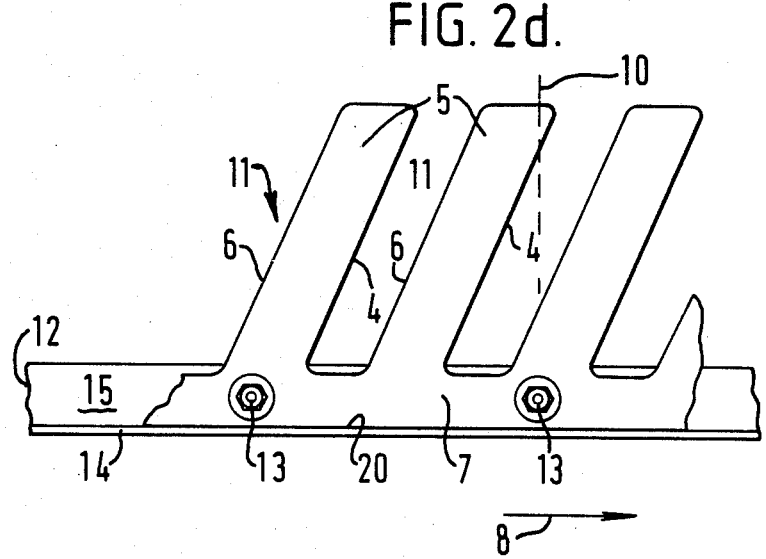

FIGS. 2(c) and 2(d) show further modifications of the elements 11 shown in FIGS. 2 and 2(b).

It is to be appreciated that in the embodiments of FIGS. 2 to 2(d) the sloping edges 6 of the elements 11 achieve the same objectives as have been described, and will be described hereinafter, obtained by the discrete inclined arms shown in FIG. 1 and in other Figures of the specification.

FIG. 3 shows a single-arm element 11 made of rigid material mounted on the flat web 14 of an angle bar 12 in such a way that in response to a heavy tip load it can rock for and aft as well as laterally, by compression of the rubber cushion 16. FIG. 3(a) shows a plan view of an opposite handed element 11. The base portion 18 of the element 11 which lies parallel to the flat web 14 of the mounting bar 12 is cut at an angle at an edge 21 so that extra resistance to twisting is obtained in response to a heavy lateral load on the element acting towards to mounting bolt. The element 11 will then pivot about the raked-back line of the cut end at 21. Again, the resilient component 16 can be either formed in various shapes of rubber, or can be steel springs, and they may be fitted in contact with the flat part 18 of the crop engaging element 11, or the opposite side of the web 14 of the mounting bar 12. The slanted end 21 of the crop engaging element 11 is optional, and the degree of slant can be varied.

It is to be noted that the element 11 of FIGS. 1 and 2 differs basically from element 11 of FIGS. 3 and 3(a) in that the base portion 18 of each element is in the one case secured to the leading upright web 15 of the mounting bar 12, and in the other case is secured to the base flange 14 of the mounting bar 12. The function of the edge 20 in FIGS. 1 and 2 in locking the element 11 against rotation about the bolt 13, is performed in the element of FIGS. 3 and 3(a) by the leading side edge 20 shown in plan view as abutting the upright leading flange 15 of the mounting bar 12.

For easy reference, throughout the drawings, components which perform similar functions, are indicated by like reference numerals, although the exact construction in a particular case may differ.

FIG. 4 shows a rear view of a mounting bar 12 with a single-arm element 11 similar to that shown in FIG. 2 but with the attachment bolt 13 passing radially or near-radially through the trailing web 14 of the angle mounting bar 12 and then through a rubber cone 16 and a protective metal disc or washer 16'. The cone shape of the resilient block 16 has the advantage that deflection of the element 11 in response to a high tip load is resisted initially by low pressure which then increases progressively. In some circumstances the position of the resilient block 16 on the underside of the trailing web 14 of the mounting bar 12 can have the advantage that stray crop material is less likely to adhere to any protusions of the mounting assembly and that the dimensions and construction of the assembly components can be within wider limits than if they had to be accommodated within the depth of the radial web 15 of the mounting bar.

As is shown in FIG. 4a, which is a plan view of FIG. 4, the angle at which the base portion 18 of the element 11 is cut relative to the trailing web 14 of the mounting bar 12, is more acute than shown in FIGS. 2 and 3. This enables the element 11 to rock more easily rearwardly at a compound angle about the line 21 of the cut end.

FIG. 4b is a plan view of a similar metal element 11 made of steel strip material but in which the inclined arm 11 has been formed by bending it at an angle to the plane of the rotor axis, so that the arm is reclined and trailing relative to the direction of rotation. This has the advantage that "hairpinning" of crop material at the leading corner is minimised, particularly when the angles of inclination of the arms relative to the trailing web are less than 70°.

FIG. 5 shows an element similar to that shown in FIG. 4 but with the pointed end 18' of its flat locating portion 18 bent radially away from the rotor centre. This helps to stabilise the element and relocate it after deflection and allows lateral pivoting to occur more easily, as indicated by the broken outline of the element 11.

FIG. 5a is a plan view of the metal element 11 shown in FIG. 5, and shows that the leading tip 19' of the crop engaging portion 19 of the element 11 can be cut back to give an anti-hairpinning effect as described with reference in FIG. 4b. It is to be understood that the raked-back leading tip portion 19 may also be stepped or serrated, to increase its abrasive effect on the crop.

A further variation is shown in FIG. 5b. Here the pointed locating portion 18 of the element 11 is bent away at 18' from the trailing web 14 of the mounting bar 12 to a position less than radial, and an arm portion 18" of the metal element 11 is perpendicular to the mounting bar 12, with only the crop engaging tip portion 19 bent to achieve the desired angle of inclination. This element is also very stable, and less metal is required for its construction.

FIGS. 6 to 9 show single-arm elements 11 which may be made of semi-rigid strip material, such as polypropylene, polyethylene, nylon or other non-metallic synthetic materials. Optionally pre-formed plastic elements 11 are fitted to angle-section mounting bars 12 in a manner similar to that described previously. To support the elements 11 and hold them in position against the effects of centrifugal force, optional shaped metal plates 22 are sandwiched between the mounting portions 18 of the elements 11 and the trailing web 14 of the mounting bar 12 and are retained in position by the mounting bolt 13. The shaped metal plates 22 in FIGS. 7 and 8 can have a spring effect if spring steel is used for their construction. The optional further shaped plate 22' shown under the head of the mounting bolt 13 in FIG. 9 ensures that a semi-rigid single-arm plastic element 11 is firmly retained in its intended angle or inclination at least in the mounting region 18. Although in FIGS. 6 to 9 the mounting bolts 13 are shown to pass approximately centrally through the base portion 18 of the elements 11, it is to be understood that the securing hole can be positioned off-centre or the free horizontal part of the base portion 18 be extended further along the web 14 away from the mounting bolt 13, to increase the resistance of the element to rotate about the mounting bolt in response to an atypically high tip load.

In FIGS. 10 to 12d further uni-directional inclined crop engaging elements 11 are shown which can be made conveniently, but not exclusively, from plastic material and which find particularly suitable application in the pick-up rotors for collecting crop for harvesting and at the same time influencing crop alignment. However, their use as conditioning and crop threshing elements is not excluded.

FIG. 10 shows a thick-walled tubular plastic sleeve 23 attached radially by means of a fixing bolt 13 and protective washer 16 to an angle-section mounting bar 12. Set tightly into the sleeve 22 and secured by a small bolt or rivet 24 is an element 11 having an angled tip portion 19, the element 11 being made conveniently of sheet plastics material. The extreme tip of portion 19 may be as indicated by the full lines, or it may have the portion indicated by the dotted lines removed to form a 2-pronged shape, or, as yet another alternative, only the small triangles indicated by the broken lines may be removed to form a coarsly serrated leading edge. This element 11 is prevented from pivoting about the fixing bolt 24 by the square-cut end of the tubular sleeve 23, but it can be deflected rearwardly and laterally, or can twist, by virtue of the resilience of the sleeve 23 and of the tip material.

In FIG. 10a it is indicated that all the elements 11 on a mounted bar 12 may be given a reclined attitude in operation by tilting the mounting bar 12 to the required angle. It is to be understood that the attitude of the elements may be changed during rotation by a cam-type or other steering mechanism of known or novel design. For example it may be arranged that during rotation laterally inclined elements engage the crop in the lower front quadrant in a plane which is radial or inclined slightly forwardly or rearwardly and are steered into a pronounced reclined attitude in the upper rear quadrant where the crop may be transferred for example into a harvester.

In FIG. 11 a similar sleeve 23 but cut at an angle to the plane of a mounting bar 12 is used to retain a number of plastic filament elements 11 which are bent double and inserted in the sleeve 23 prior to securing it by a fixing bolt and washer to the radial or near-radial web of the bar. Advantages of the elements 11 shown in FIGS. 10 and 11 are their broad working width and their multi-filamented construction and resilience which assist in collecting crop from the ground. The plastic filament elements 11 as shown in FIG. 11 are thin enough, at approximately 3 to 8 mm diameter, to deflect in almost any direction.

The element 11 shown in FIG. 12 differs from the version shown in FIG. 11 in that only one plastic or metal rod 11 of approximately 5 to 15 mm diameter is inserted in a U-shape into the retaining sleeve 23. To protect the plastic sleeve 23, a plastic washer 16' is sandwiched between the sleeve 23 and the nut of the fixing bolt 13 or a metal washer beneath it. A view in the direction of arrows AA is shown in FIG. 12a. It is to be appreciated again that the mounting bolt 13 may be positioned off-centre so as to maximise the resistance of the element to rotate laterally about bolt 13.

It will be appreciated that a retaining sleeve may also be formed of rigid material which can then be attached to the radial web of the mounting bar, using a resilient cushion or spring to achieve additional deflection under load. In the case where resilient sleeve materials are used in the construction of crop engaging elements, it is not essential that the upstanding web of the mounting bar leads and protects the front of the sleeve. Whilst under load this mode of operation allows the element to bend away gradually from the fixing bolt, and greater resistance to deflection is obtained with the upstanding web of the mounting bar trailing. The two modes of use are illustrated in FIG. 12b, the arrows indicating the alternative directions of load application.

FIG. 12c shows plastic elements 11 as described in FIGS. 12 and 12a, so attached to mounting bars 12 that both ends of the rod material lie in broadly the same plane relative to the ground. This contributes to a clean pick-up and effective crop alignment. An alternative mode of use is shown in FIG. 12d; this is particularly suitable where large windrows of heavy crop material have to be collected.

FIG. 13 shows a cross-sectional diagrammatic view of the arrangement of the single-arm elements 11 on two intermeshing crop moving rotors 25 and 26 which give maximum transverse alignment of the herbage material. The rotors 25 and 26 are synchronised and driven at identical speed. A portion of the development of the operative rotor surface is given and shows the elements 11 on the upper and lower mounting bars 12, 12' to be angled in the same direction relative to the rotor end plates.

In the view of section AA shown in FIG. 14 it is seen that a herringbone pattern is obtained in the overlap zone between the two rotors. Where there is no lateral offset in the mounting positions of the elements on opposing rotors, the pattern shown in the left-hand part of FIG. 14 is obtained; lateral offset by half the effective width of the elements gives the pattern shown in the right-hand part.

To achieve a crop jumbling effect with primarily longitudinal alignment of the herbage, the direction of inclination of the elements on one of the rotors needs to be reversed from that shown in FIG. 14. The resultant pattern in the overlap zone is shown in FIG. 15 with the elements lying in coinciding planes in the left, and offset parallel planes in the right-hand part of the illustration.

FIG. 15a indicates that a crop aligning and substantial conditioning effect can be achieved also if in a 2-rotor configuration the rotors do not overlap and their tip speeds are optionally substantially different and the direction of rotation is identical or opposite. The same effect is obtained if a single rotor co-operates with one or more static rows of elements within the crop duct formed by the rotor housing and the rotor itself, provided the elements lie in the same plane of inclination relative to each other as is indicated in FIG. 15a. It is to be understood that with reference to FIG. 14 the converse applies, namely a speed differential will reduce the alignment effect achieved with intermeshing rotors as depicted.

Using the elements described in FIG. 12 as an example, one of a range of mounting patterns as indicated in the section of the development is illustrated in FIG. 16. Assuming a 30 mm effective tip spacing laterally between all the element tips and a rotor made up of 8 mounting bars, then a 1.7 m wide rotor will require approximately 56 crop engaging elements for the ground to be swept every 30 mm per rotor rotation. Whilst in preceding figures the mounting bars are shown to be straight and substantially transverse to the longitudinal rotor axes, it is to be understood that they may also be arranged differently, for example in a single, double or split helical pattern.

In FIGS. 17 and 18 a single-rotor and a twin intermeshing rotor conditioner are shown for treating pre-cut grass. However, it should be noted that both these devices may be combined with mowing machines to achieve simultaneous conditioning at cutting. The conditioning rotor 26 in FIG. 17 is covered by a hood 27 to allow crop to be picked up at the front and to be treated by the elements 11 attached to the rotor 26 during its passage to the rear. The treatment is effected against frictional resistance provided by the hood 27 and by two rows of optional uni-directional inclined elements 28 at the crop intake region. The optional restriction formed by the device 28 or an adjustable serrated abrasion plate or similar retarding device at the front, ensures that sufficient work for effective treatment is done on the crop, including the upper part of the herbage layer. A baffle 29 at the rear of the hood 27 ensures that the material falls onto the ground gently and can be formed into a loosely arranged swath.

In FIG. 17a a portion of a 6-bar pick-up rotor 26 is shown, all the elements 11 being inclined at 45° towards the right-hand end plate of the rotor. In FIG. 17b which shows a portion of another rotor 26, the elements 11 on adjacent mounting bars 12 are inclined in opposite directions.

The cross-sectional view in FIG. 18 shows a twin-rotor pick-up conditioner in which both rotors 25 and 26 are driven in synchronisation at identical speed and so that the tip circles overlap. As mentioned previously, if all the elements 11 are inclined towards the rotor end plates on one side of the machine, then a crop aligning effect is obtained. If on each rotor they are inclined towards the end plate on opposite sides of the machine, then a scrambling effect is achieved in the main, with a predominance of the crop material lying generally in the longitudinal direction. Whilst the line connecting the centres of the two rotors points approximately in the 10.30 O'clock direction, the upper secondary rotor 25 may be fitted to co-operate with the primary lower rotor 26 in alternative positions, the rearmost position of major practical significance being indicated by the broken outline of a rotor 26 in approximately the 1 o'clock position. The rotor housing 27 and crop deflector 29 again serve the purpose of assisting crop treatment in the intake region and depositing a loosely arranged swath onto the ground in the rearmost region. In an alternative embodiment not shown the rotors may be spaced apart and rotated in the same direction so that crop has to follow the outline of rotor housing 27. Particularly for the purpose of crop conditioning, the line connecting the centres of the two rotors may then lie anywhere between the 10 o'clock and 3 o'clock positions.

FIG. 19 shows by way of example only a pick-up header for a forage harvester, self-loading forage wagon, or baling machine. Essentially it consists of side plates 30 which are pivoted on brackets 31 on the bottom rear and can be lifted or lowered relative to the ground by a small hydraulic ram 32 acting on a bracket 33 at the upper rear. Skids 34 under the rotor centre prevent unnecessary ground contact to be made by the pick-up rotor 26, the skids being height adjustable. From the front of a transverse bar 35 joining the side plates 30 of the unit hangs a stiff curtain 36 which prevents crop and foreign objects being projected forwardly and in operation guides the crop into the intake portion of the rotor housing 27. The front part of the housing 27 is pivoted so that it is able to respond automatically to differing amounts of crop bulk in the windrow. The next and subsequent portions of the rotor cover 27 are also pivoted, and adjustable stops on both end plates may be set so that they allow a pre-determined minimum clearance between the crop engaging elements and the rotor cover 27 to be maintained. Depending on the quantity of crop passing into the machine, either one or both sections of the cover 27 may be lifted to accommodate the crop. This is shown by the broken lines. The hood sections, being made of light material, can thus exert gentle pressure on the crop stream, keeping it in contact with the elements. Before the top-dead-centre position is reached by the crop the hood structure 27 begins to diverge from the rotor 26, allowing the crop to detach itself from the elements, to be delivered into the feed intake of the harvesting machine. An optional stripping rotor 37 behind the pick-up rotor 26 ensures that stray material is collected and also directed into the intake of the harvester.

FIG. 20 is a diagrammatic cross-sectional view of the threshing portion of a threshing machine or combine-harvester. A slatted chain elevator 38 delivers the cut crop from the header into the path of the threshing drum 39, which in this case is a rotor made up of inclined elements 11 as previously described. The elements 11 may be aligned unidirectionally or in opposite directions on adjacent mounting bars 12, or in opposite directions in each half of each mounting bar 12. Beneath the rotor 39 is an open-grate concave 40 of conventional design which retards the crop stream and contributes to grain being removed from the grain-bearing parts of the crop material. As previously mentioned the crop engaging elements 11 are able to intrude into the crop layer, loosening it and freeing grain from the heads. The crop layer is kept open, by successive elements entering it, enabling free grain to pass easily outwardly and escape through the concave. Some of the arrangements of crop engaging elements 11 referred to earlier also contribute to the crop being turned in space and thus further improving the conditions for grain separation. At the rear of the threshing drum 39 a stripper beater 41 of conventional design ensures that the crop material is directed positively onto the final separating and/or conveying mechanism downstream. Because of the abrasiveness of straw, crop engaging elements 11 made of steel will normally be preferable to a plastic construction. Impact protection and the ability to respond to atypical tip loads in a mult-directional path of deflection are important safety features. However, in this application the mounting of elements 11 will be arranged so that during deflection the effective tip diameter can only decrease.

In a further embodiment (not shown) two such threshing drums made up of inclined elements are fitted in tandem so that they rotate in the same sense. The crop leaving the first or upstream drum is fed preferably on to the upper half of the second or downstream drum so that a sharp change of direction is forced onto the crop. To assist crop transfer from the first drum to the second a stripping rotor 41 may be fitted optionally between the drums. The common transverse plane of the drums may lie preferably but not exclusively between 1 o'clock and 5 o'clock. The concave 40 will be shaped to extend and guide the crop beneath the transfer rotor and the second drum.

FIGS. 21a, b and c show cross-sectional views of three types of alternative mounting bar 12 strengthened at the trailing edge by a lip 42 which is bent up or down or is radiused. In this way the resistance to deformation of the areas behind the mounting bolts 13 which are subjected to high load concentrations during repeated deflection cycles of the elements is greatly increased where necessary.

Depending on the various applications illustrated in FIGS. 1 to 20, rotor diameters may vary from approximately 0.3 to 1.0 m diameter, the preferred range being 0.4 to 0.6 m diameter. Tip speeds of the crop engaging elements may vary within the approximate range of 3 to 30 m/s, mainly 10 to 23 m/s. The inclinations of the crop engaging elements to the transverse rotor axis will normally be 45° to 75°, but slightly greater and lesser angles are not excluded for specific purposes. Where crop engaging elements comprise rod-like filaments, these may be of a variety of cross-sectional shapes, including hollow centred.

It is to be appreciated that embodiments of the present invention find application in many different areas including various post-cutting treatment of forage crops. Technically a pick-up rotor has to be capable of efficiently collecting crop from the ground; whether or not it is subsequently returned to the ground or fed into a harvesting mechanism is a matter of particular requirements. If it is returned to the ground, the process can be called tedding or turning, and with appropriate guidance of the crop it can also become spreading or windrowing.

What I claim is:

1. Apparatus for threshing a grain crop comprising:
a frame,
a rotor mounted on the frame for conveying crop by rotation of the rotor and for threshing the crop while it is being conveyed by the rotor, and
drive means for driving the rotor in rotation,
said rotor comprising support means and a plurality of crop engaging elements mounted on said support means, each crop engaging element having an elongate crop engaging portion extending outwardly from the rotor, and a base portion secured to the support means,
said crop engaging elements being arranged on the rotor in a series of transverse arrays each of which extends in a direction transverse to the principal direction of crop flow through the apparatus, the axis of rotation of the rotor being transverse to said principal direction of crop flow and each transverse array being spaced circumferentially from its adjacent transverse array around the axis of rotation of the rotor,
each crop engaging element comprising a discrete arm which is inclined to a radial plane perpendicular to the rotor axis, said arm being inclined away from said radial plane in the same sense over the whole of its length, the elements of each array being arranged with a number of successive elements along the array being similarly inclined in that said elements are all inclined away from said radial plane in the same sense,
each crop engaging element being unsharpened and being arranged to engage the crop substantially without cutting of the crop, the crop engaging portions of the elements being of sufficient length to protrude into the crop and to effect substantial conveying of the crop,
each element having mounting means for mounting said element on said support means with a preselected inclination which is maintained in normal operation, each element being resiliently yieldable upon contact with an abnormal load and being mounted with sufficient stiffness for the elements to be capable of returning after yielding to their undeflected dispositions at least predominantly by virtue of the resilience of the yielding arrangement without sole reliance on centrifugal effect,
said support means comprising a plurality of support members, each support member having an inner, base portion and an upstanding, shielding flange, the upstanding shielding flange extending outwardly from said base portion away from the axis of rotation of the rotor, said shielding flange being arranged to precede said crop engaging element relative to the motion of the element on rotation of the rotor so as to shield the base of the element,
each said mounting means comprising an axial fastening means and a resilient biasing means, each said discrete arm being secured to its associated support member by a single axial fastening means having a principal axis along which the fastening means extends in a generally radial direction through said base portion of said element and through said base portion of said support means, said resilient biasing means acting to bias said crop engaging element towards said normal operating position,
each said crop engaging element comprising a single elongate member shaped to produce said inclined, discrete outwardly directed arm and said base portion for securement to said support means, each said element being located by a leading surface of the crop engaging element abutting against the trailing surface of the said upstanding shielding flange so as to prevent rotation of the element about the axis of the axial fastening means in normal operation, but such as to allow the crop engaging element to be yielding upon meeting an abnormal load by movement of the arm of the element rearwardly away from the upstanding flange of the support member against the effect of the biasing means.

2. Apparatus for threshing a grain crop according to claim 1 including:
a threshing concave co-operating with the rotor to provide a channel along which crop is conveyed by the rotor and is threshed while being conveyed, and
said rotor having transverse groups of similarly inclined elements arranged such that the prevailing sense of inclination of each group is opposite to that of the next adjacent group around the circumference of the rotor, so as to impart a lateral shaking effect to the crop, to keep the crop layer loose and to promote effective separating of free grain from the crop.

3. Apparatus for threshing a grain crop according to claim 1, including:
a second rotor arranged parallel to and opposite to the first rotor, the crop being conveyed between the rotors and being threshed while being conveyed,
said second rotor comprising support means and a plurality of crop engaging elements mounted on said support means, and being constructed in the same manner as the first rotor,
said first and second rotors being arranged parallel to each other and opposite each other, with elements of one array on one rotor extending into the crop flow from one side of the crop flow and elements of another array of the other rotor opposite to the first array extending into the crop flow from an opposite side of the crop flow,
the prevailing sense of inclination of the first array of elements being opposite to the prevailing sense of inclination of the second array so that when viewed along the principal direction of crop flow between the rotors a herringbone pattern of elements is presented to the crop, said opposite inclinations of the elements of the arrays being arranged for imparting a lateral shaking effect to the crop, to keep the crop layer loose and to promote effective separating of free grain from the crop.

4. Apparatus according to claim 1 in which the said successive elements along the transverse array which have the said inclinations in the same sense constitute a group of elements forming a substantial proportion of the total number of elements in the array.

5. Apparatus according to claim 1 in which substantially all the elements of the transverse array are inclined in the same sense.

6. Apparatus for conditioning grass or other fibrous fodder crop comprising:
a mobile frame for movement over the ground,
a rotor mounted on the frame for picking up and conveying crop by rotation of the rotor and for conditioning the crop while it is being conveyed by the rotor, and
drive means for driving the rotor in rotation,
said rotor comprising support means and a plurality of crop engaging elements mounted on said support means, each crop engaging element having an elongate crop engaging portion extending outwardly from said rotor, and a base portion secured to the support means,
said crop engaging elements being arranged on the rotor in a series of transverse arrays each of which extends in a direction transverse to the principal direction of crop flow through the apparatus, the axis of rotation of the rotor being transverse to said principal direction of crop flow, and each transverse array being spaced circumferentially from its adjacent transverse array around the axis of rotation of the rotor,
each crop engaging element comprising a discrete arm which is inclined to a radial plane perpendicular to the rotor axis, said arm being inclined away from said radial plane in the same sense over the whole of its length, the elements of each array being arranged with a number of successive elements along the array being similarly inclined, in that said elements are all being inclined away from said radial plane in the same sense,
each crop engaging element being unsharpened and being arranged to condition the crop by lacerating, bruising, bending, scuffing, and otherwise abrading the crop, without any substantial cutting of the crop, the crop engaging portions of the elements being of sufficient length to protrude into the crop and to effect substantial conveying of the crop,
each element having mounting means for mounting said element on said support means with a preselected inclination which is maintained in normal operation without reliance on centrifugal effect, each element being resiliently yieldable upon contact with an abnormal load and being mounted with sufficient stiffness for the elements to be capable of returning after yielding to their undeflected dispositions at least predominantly by virtue of the resilience of the yielding arrangement without sole reliance on centrifugal effect,
said support means comprising a plurality of support members, each support member having an inner, base portion and an upstanding, shielding flange, the upstanding shielding flange extending outwardly from said base portion away from the axis of rotation of the rotor, said shielding flange being arranged to precede said crop engaging element relative to the motion of the element on rotation of the rotor so as to shield the base of the element,
each said mounting means comprising an axial fastening means and a resilient biasing means, each said discrete arm being secured to its associated support member by a single axial fastening means having a principal axis along which the fastening means extends in a generally radial direction through said base portion of said element and through said base portion of said support means, said resilient biasing means acting to bias said crop engaging element towards said normal operating position,
each said crop engaging element comprising a single elongate member shaped to produce said inclined, discrete outwardly directed arm and said base portion for securement to said support means, each said element being located by a leading surface of the crop engaging element abutting against the trailing surface of the said upstanding shielding flange so as to prevent rotation of the element about the axis of the axial fastening means in normal operation, but such as to allow the crop engaging element to be yielding upon meeting an abnormal load by movement of the arm of the element rearwardly away from the upstanding flange of the support member against the effect of the biasing means.

* * * * *